United States Patent Office 2,885,381
Patented May 5, 1959

2,885,381
MINERAL REINFORCING AGENTS IN CONJUGATED DIENE/HETEROCYCLIC NITROGEN BASE COPOLYMERS

Joseph F. Svetlik, Akron, Ohio, assignor to Phillips Petroleum Company, a corporation of Delaware No Drawing. Application December 30, 1955
Serial No. 556,470

7 Claims. (Cl. 260—41.5)

This invention relates to a new composition of matter and method of preparing same. In one of its aspects, this invention relates to a rubbery conjugated diene/heterocyclic nitrogen base copolymer reinforced with mineral pigments.

The use of non-black pigments such as mineral pigments in synthetic rubber is advantageous for many uses where a white or colored rubber stock is desired. Such pigments have been employed in synthetic rubbers such as butadiene/styrene, butadiene/acrylonitrile, and similar copolymers. However, these mineral pigments have produced only moderate reinforcement in the rubbers in which they have been employed and in many instances the properties of the finished vulcanized products have been far inferior to vulcanized products in which carbon black has been used as the reinforcing agent.

It has now been found that when mineral pigments are employed as the sole reinforcing agent in rubbery conjugated diene/heterocyclic nitrogen base copolymers and particularly butadiene/vinylpyridine rubbers, they have a unique reinforcing effect and vulcanized products having physical properties comparing favorably with carbon black reinforced rubbers are readily obtained.

An object of this invention is to provide a novel reinforced conjugated diene/heterocyclic nitrogen base copolymer.

Another object of this invention is to provide a reinforced rubber of good tensile strength, elongation, resilience and flex life suitable for use in white or colored rubber articles.

Other objects and advantages of this invention will be apparent to those skilled in the art having been given this disclosure.

According to this invention a rubbery copolymer of a butadiene and a heterocyclic nitrogen base is solely reinforced with a mineral pigment. The product can be vulcanized.

As has been indicated, these reinforced rubbers of this invention are useful for preparing white or colored stock, such stock being useful in tire side walls, molded rubber articles, wire coverings and the like.

The mineral pigment can be employed in an amount over a wide range and in the same manner as is carbon black. In general, the amount of mineral pigment employed will be in the range of 25 to 100 parts by weight per 100 parts of rubber (p.h.r.) and, for any particular rubber, will be governed by the type of product desired, i.e. amount of reinforcing. The mineral pigment can be used singly or mixtures of two or more of these materials can be employed, however, no other reinforcing agent, such as carbon black, is employed.

These pigments can be incorporated into the copolymer at any time prior to the vulcanization and by any method known in the art. Generally these materials are incorporated by well known mixing operations such as on a rubber mill or an internal mixer or they can be incorporated by the well known latex masterbatching procedures, i.e. dispersing the pigment in the latex prior to coagulation. Other compounding ingredients can also be incorporated such as plasticizers, vulcanizing agents, vulcanization accelerators, and the like.

The mineral pigments useful in this invention are generally less than about 10 microns in size. Greater reinforcing is obtained with finer material, and therefore, I prefer to use a material of a maximum particle size of about 5 microns. It will be understood by those skilled in the art that when such materials are ground to less than the desired maximum, many particles will be considerably finer. Among the mineral fillers useful in this invention are the various clays, silica, kaolin, calcium silicate, titanium dioxide, hydrated alumina, calcined magnesia, calcium carbonate, calcium oxide, and the like. Silica and clays, and particularly silica, have been found to give very good results and are therefore preferred as reinforcing pigments in this invention. Furthermore, the hard clays are superior to soft clays.

As hereinbefore mentioned, the rubbery copolymers in which mineral pigments have been found to have this surprising reinforcing effect are copolymers of a conjugated diene with a heterocyclic nitrogen base.

As those skilled in the art will understand, the conjugated dienes most frequently employed are those which contain from four to eight, inclusive, carbon atoms per molecule and include 1,3-butadiene, isoprene (2-methyl-1,3-butadiene), piperylene, 2-methyl-1,3-pentadiene, 2,3-dimethyl-1,3-butadiene, chloroprene and others. Those conjugated dienes of the greatest commercial significance are 1,3-butadiene, isoprene and chloroprene and are preferred as the conjugated diene of this invention. With a greater number of carbon atoms, the polymerization rate decreases somewhat, and there are so many isomers that it is not practical, with present procedures, to provide pure compounds. However, in a broader aspect of the invention, conjugated dienes having more than eight, such as twelve, carbon atoms per molecule can be used. Furthermore, various alkoxy, such as methoxy and ethoxy, and cyano derivatives of these conjugated dienes, are also applicable. Thus, dienes such as phenylbutadiene, 2,3-dimethyl-1,3-hexadiene, 2-methoxy-3-ethyl butadiene, 2-ethoxy-3-ethyl-1,3-hexadiene, 2-cyano-1,3-butadiene, and 2,3-diethyl-1,3-octadiene are applicable.

The polymerizable heterocyclic nitrogen bases which are applicable for the production of the polymeric materials are those of the pyridine, quinoline and isoquinoline series which are copolymerizable with a conjugated diene and contain one and only one $CH_2=C<$ substituents and preferably the group is

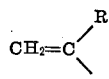

wherein R is either hydrogen or a methyl group. That is, the substituent is either a vinyl or an alpha-methylvinyl (isopropenyl) group. Of these compounds, the pyridine derivatives are of the greatest interest commercially at present. Various substituted derivatives are also applicable but the total number of carbon atoms in the nuclear substituted groups, such as alkyl groups, should not be greater than 12 because the polymerization rate decreases somewhat with increasing size of the alkyl group. Compounds where the alkyl substituents are methyl and/or ethyl are available commercially and are preferred in this invention.

These heterocyclic nitrogen bases have the formula

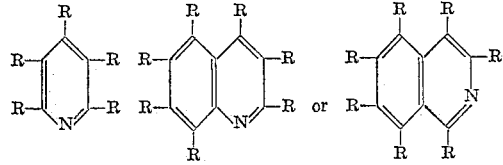

where R is selected from the group consisting of hydrogen, alkyl, vinyl, alpha-methylvinyl, alkoxy, halo, hydroxy, cyano, aryloxy, aryl and combinations of these groups such as haloalkyl, alkylaryl, hydroxyaryl, and the like, one and only one of said groups being of the type $CH_2=C<$ and preferably being a vinyl or alpha-methylvinyl group; and the total number of carbon atoms in the nuclear substituted groups being not greater than 15. As has been indicated, the preferred compounds are those wherein the R groups, other than the vinyl or alpha-methylvinyl group, are hydrogen or alkyl of 1 to 4 carbon atoms. Examples of such compounds are 2-vinylpyridine; 2-vinyl-5-ethylpyridine; 2-methyl-5-vinylpyridine; 4-vinylpyridine; 2,3,4-trimethyl-5-vinylpyridine; 3,4,5,6-tetramethyl - 2 - vinylpyridine; 3 - ethyl - 5 - vinylpyridine; 2,6 - diethyl - 4 - vinylpyridine; 2 - isopropyl - 4 - nonyl-5 - vinylpyridine; 2 - methyl - 5 - undecyl - 3 - vinylpyridine; 2 - decyl - 5 - (alpha - methylvinyl)pyridine; 2-vinyl - 3 - methyl - 5 - ethylpyridine; 2 - methoxy - 4-chloro - 6 - vinylpyridine; 3 - vinyl - 5 - ethoxypyridine; 2 - vinyl - 4,5 - dibromopyridine; 2 - vinyl - 4 - chloro - 5-bromopyridine; 2(alpha-methylvinyl) - 4 - hydroxy - 6-cyanopyridine; 2 - vinyl - 4 - phenoxy - 5 - methylpyridine; 2 - cyano - 5 - (alpha - methylvinyl)pyridine; 3 - vinyl-5 - phenylpyridine; 2 - (para - methylphenyl) - 3 vinyl-4 - methylpyridine; 3 - vinyl - 5 - (hydroxyphenyl)pyridine; 2 - vinylquinoline; 2 - vinyl - 4 - ethylquinoline; 3-vinyl - 6,7 - di - n - propylquinoline; 2 - methyl - 4 - nonyl-6 - vinylquinoline; 4(alpha - methylvinyl) - 8 -dodecylquinoline; 3 - vinylisoquinoline; 1,6 - dimethyl - 3 - vinylisoquinoline; 2 - vinyl - 4 - benzyl-quinoline; 3 - vinyl - 5-chloroethylquinoline; 3 - vinyl - 5,6 - dichloroisoquinoline; 2 - vinyl - 6 - ethoxy - 7 - methylquinoline; 3 - vinyl - 6-hydroxymethylisoquinoline; and the like.

The copolymers can be prepared from mixtures of conjugated dienes and polymerizable heterocyclic nitrogen compounds or from mixtures of conjugated dienes, heterocyclic nitrogen compounds and certain other polymerizable monomers. The latter monomers include those containing an active $CH_2=C<$ group such as aryl olefins, esters of acrylic and substituted acrylic acids, nitriles, amides, ketones, ethers, and halides. Specific examples of such copolymerizable monomers include styrene, various alkyl and substituted alkyl styrenes, 3-phenyl-3-butene-1-ol, p-chlorostyrene, p-methoxystyrene, alpha-methylstyrene, vinylnaphthalene, methyl acrylate, ethyl acrylate, methyl methacrylate, ethyl methacrylate, butyl methacrylate, methyl ethacrylate, acrylonitrile, methacrylonitrile, methacrylamide, methyl isopropenyl ketone, methyl vinyl ketone, methyl vinyl ether, vinyl acetate, vinyl chloride, vinylidene chloride, vinylfurane, vinylcarbazole, vinylacetylene and the like.

These copolymers can be prepared by any method known in the art but are most generally prepared by emulsion polymerization. These methods for preparing synthetic rubbery materials are known in the art and this invention is concerned with reinforcing such materials. In such copolymers sufficient diene is used so that the copolymer will have rubbery properties. Generally at least 50 weight parts conjugated diene per 100 parts total monomers is charged to the polymerization zone in preparing such copolymers. As has been indicated, these fillers have a unique effect on rubber copolymers of a conjugated diene and a heterocyclic nitrogen base. These copolymers should be prepared from monomer mixture containing at least 10 parts of the heterocyclic nitrogen containing compound by weight per 100 parts total monomers charged to the polymerization zone. It will be understood by those skilled in the art that the monomers do not always combine in the ratio charged, however, when the monomers are charged in the ratio range as indicated, sufficient conjugated diene and heterocyclic nitrogen base will generally combine to give a rubbery copolymer of the type desired. That is, the copolymer should be rubbery and should contain at least about 5 weight percent combined heterocyclic nitrogen base.

To further describe my invention and to illustrate its advantages, the following examples are given. The copolymer ratios are given in terms of monomers charged to the polymerization system since such is conventional. Those skilled in the art will understand that any of the conjugated dienes, heterocyclic nitrogen containing monomers and comonomers mentioned can be used in place of those of the examples with similar good results.

EXAMPLE I

A butadiene/2-vinylpyridine copolymer was prepared by emulsion polymerization at 41° F. in accordance with the following recipe:

| | Parts by weight |
|---|---|
| Water | 180 |
| Butadiene | 80 |
| 2-vinylpyridine | 20 |
| Potassium fatty acid soap | 5 |
| Daxad 11 [1] | 0.1 |
| KCl | 0.2 |
| $K_4P_2O_7$ | 0.165 |
| $FeSO_4 \cdot 7H_2O$ | 0.14 |
| Cumene hydroperoxide | 0.1 |
| Mercaptan blend [2] | 0.4 |

[1] Sodium salt of condensed alkyl aryl sulfonic acid.
[2] A blend of tertiary $C_{12}$, $C_{14}$, and $C_{16}$ aliphatic mercaptans in a ratio of 3:1:1 parts by weight.

A 59.3 percent conversion was attained in 13.1 hours. The polymer had a Mooney value (ML-4) of 18.

The butadiene/2-vinylpyridine copolymer and also a 75/25 butadiene/styrene rubber (52 ML-4) prepared by emulsion polymerization at 41° F were compounded using as pigments a high abrasion furnace black (Philblack O), silica (Linde Silica), and aluminum silicate (Dixie Clay). Since the silica and clay have a higher density than the carbon black, they were employed on a volume basis rather than on a straight weight substitution basis. The compounding recipes were as follows:

| | Parts by Weight | | | | | |
|---|---|---|---|---|---|---|
| | 1 | 2 | 3 | 4 | 5 | 6 |
| Butadiene/2-vinylpyridine rubber | 100 | 100 | 100 | | | |
| Butadiene/styrene rubber | | | | 100 | 100 | 100 |
| Carbon black | 50 | | | 50 | | |
| Linde Silica | | 64 | | | 64 | |
| Dixie clay | | | 72 | | | 72 |
| Flexamine [1] | 1 | 1 | 1 | 1 | 1 | 1 |
| Zinc oxide | 3 | 3 | 3 | 3 | 3 | 3 |
| Stearic acid | 2 | 2 | 2 | 1 | 1 | 1 |
| Circo-Para [2] | 5 | 5 | 5 | 5 | 5 | 5 |
| Sulfur | 1.75 | 1.75 | 1.75 | 1.75 | 1.75 | 1.75 |
| Santocure [3] | 1.2 | 1.25 or 2.0 | 1.25 or 2.0 | 1.0 | 1.25 | 1.25 |

[1] Physical mixture containing 65 percent of a complex diarylamine-ketone reaction product and 35 percent of N, N'-diphenyl-p-phenylenediamine.
[2] A blend of equal parts by weight of Circosol-2XH with Para Flux. Circosol-2XH: A petroleum hydrocarbon softener containing hydrocarbons of high molecular weight, in the form of a heavy, viscous, transparent, pale green, odorless liquid of low volatility; sp. gr. 0.940; Saybolt Universal viscosity at 100° F., about 2000 seconds. Para Flux: Saturated polymerized hydrocarbon.
[3] N-cyclohexyl-2-benzothiazylsulfenamide.

The stocks were milled, cured 30 minutes at 307° F., and physical properties determined. Results were as follows:

The stocks were milled, cured 45 minutes at 307° F.,

UNAGED SAMPLES

| Pigment | Parts Pigment | Parts Santocure | 80° F. | | | ΔT °F. | Resilience, Percent | Flex Life, M[1] | Shore Hardness | 212° F., Compression Set | Compounded MS-1½ at 212° F. |
|---|---|---|---|---|---|---|---|---|---|---|---|
| | | | 300% Modulus, p.s.i. | Tensile, p.s.i. | Elongation, Percent | | | | | | |

Butadiene/2-Vinylpyridine Rubber

| Philblack O | 50 | 1.2 | 1,360 | 2,660 | 500 | 95.8 | 60.0 | 15.3 | 66 | 22.8 | 20.5 |
| Linde Silica | 64 | 1.25 | 1,760 | 3,020 | 490 | | | | | | 53.5 |
| Do | 64 | 2.0 | 1,660 | 2,440 | 410 | | | | | | 45.5 |
| Dixie Clay | 72 | 1.25 | 730 | 1,300 | 595 | 76.7 | 64.7 | 45.6 | 59 | 30.0 | 11.5 |
| Do | 72 | 2.0 | 860 | 1,380 | 555 | 71.3 | 65.8 | 32.9 | 60 | 30.5 | 12.0 |

Butadiene/Styrene Rubber

| Philblack O | 50 | 1.0 | 1,610 | 3,050 | 470 | 66.9 | 62.8 | 32.5 | 61 | 20.6 | 36.5 |
| Linde Silica | 64 | 1.25 | | 170 | 400 | | | | | | 105.0 |
| Dixie Clay | 72 | 1.25 | | 630 | 840 | 109.4 | 59.9 | 32.6 | 49 | 45.5 | 22.0 |

OVEN AGED 24 HOURS AT 212° F.

Butadiene/2-Vinylpyridine Rubber

| Philblack O | 50 | 1.2 | | 2,460 | 290 | 76.7 | 65.2 | 4.0 | 70 | | |
| Linde Silica | 64 | 1.25 | 2,290 | 2,580 | 340 | | | | | | |
| Do | 64 | 2.0 | | 2,030 | 270 | | | | | | |
| Dixie Clay | 72 | 1.25 | 1,260 | 1,320 | 320 | 58.5 | 70.3 | 7.3 | 60 | | |
| Do | 72 | 2.0 | 1,320 | 1,320 | 300 | 60.2 | 70.9 | 3.8 | 64 | | |

Butadiene/Styrene Rubber

| Philblack O | 50 | 1.0 | 2,640 | 3,220 | 340 | 54.1 | 68.8 | 7.7 | 66 | | |
| Linde Silica | 64 | 1.25 | 440 | 490 | 365 | | | | | | |
| Dixie Clay | 72 | 1.25 | 460 | 940 | 650 | 54.1 | 70.7 | 1.3 | 58 | | |

[1] Thousands of flexures to failure.

EXAMPLE II

The following rubbers were compounded in a recipe in which Dixie Clay and $TiO_2$ were used but no carbon black:

(1) 75/25 butadiene/2-methyl-5-vinylpyridine rubber prepared by emulsion polymerization at 41° F. to 62 percent conversion; 50 ML-4.

(2) 85/15 butadiene/2-methyl-5-vinylpyridine rubber prepared by emulsion polymerization at 41° F. to 61 percent conversion; 45 ML-4.

(3) 70/20/10 butadiene/2-methyl-5-vinylpyridine/acrylonitrile rubber prepared by emulsion polymerization at 41° F. to 60 percent conversion; 61 ML-4.

*Compounding recipe*

| | Parts by weight |
|---|---|
| Rubber | 100 |
| Dixie Clay [1] | 100 |
| Plasticizer SC [2] | 20 |
| Stearic acid | 1 |
| Sulfur | 0.25 |
| Altax [3] | 3 |
| Tuads [4] | 2 |
| BLE [5] | 3 |
| $TiO_2$ | 10 |

[1] Aluminum silicate.
[2] Glycol ester of vegetable oil fatty acid.
[3] Benzothiazyl disulfide.
[4] Tetramethyl thiuram disulfide.
[5] High temperature reaction product of diphenylamine and acetone.

and physical properties determined. The following results were obtained:

| | Rubber | | |
|---|---|---|---|
| | 1 | 2 | 3 |
| Unaged Samples: | | | |
| Compression set, percent | 9.1 | 12.4 | 3.3 |
| 300% Modulus, p.s.i., 80° F | 920 | 690 | 680 |
| Tensile, p.s.i., 80° F | 1,480 | 1,000 | 1,390 |
| Elongation, percent, 80° F | 605 | 575 | 720 |
| ΔT °F | 55.1 | 54.1 | 74.0 |
| Resilience, percent | 67.7 | 70.3 | 61.2 |
| Flex life, thousands of flexures to failure | 19.0 | 6.2 | 17.2 |
| Shore Hardness | 46 | 46 | 47 |
| Compounded MS-1½ | 18 | 23 | 21.5 |
| Oven Aged 24 Hours at 212° F.: | | | |
| 300% Modulus, p.s.i., 80° F | 1,010 | 830 | 820 |
| Tensile, p.s.i., 80° F | 1,360 | 1,350 | 1,470 |
| Elongation, percent, 80° F | 485 | 585 | 610 |
| ΔT °F | 51.0 | 48.7 | 69.6 |
| Resilience, percent | 70.5 | 73.0 | 63.7 |
| Flex life, thousands of flexures to failure | 4.5 | 1.6 | 10.7 |
| Shore hardness | 49.5 | 51.5 | 52 |

I claim:

1. A composition of matter comprising a copolymer of a conjugated diene and a heterocyclic nitrogen containing monomer having a sole $CH_2=C<$ substituent, said copolymer having been compounded with 25–100 weight parts per 100 parts of said copolymer of a finely ground mineral pigment selected from the group consisting of silica and aluminum silicate as the sole reinforcing agent.

2. A composition of matter comprising a copolymer prepared by copolymerizing a monomer mixture comprising at least 50 parts by weight of a conjugated diene per 100 parts of total monomers, at least 10 parts by weight of a heterocyclic nitrogen monomer selected from the pyridine, quinoline, and isoquinoline series, said heterocyclic nitrogen monomers containing a sole

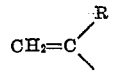

substituent wherein R is selected from the group consisting of hydrogen and methyl and the total number of carbon atoms in nuclear substituents is in the range of 2 to 15, said copolymer being compounded with a mineral pigment selected from the group consisting of silica and aluminum silicate in the range of 25 to 100 weight parts per 100 parts of said copolymer as the sole reinforcing agent.

3. A composition of matter comprising the copolymerized product of copolymerizing per 100 weight parts of monomers at least 50 weight parts of a conjugated diene of 4 to 12 carbon atoms and at least 10 weight parts of a heterocyclic nitrogen monomer selected from the pyridine, quinoline, and isoquinoline series, said heterocyclic monomer having a sole

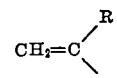

substituent wherein R is selected from the group consisting of hydrogen, and methyl and the total number of carbon atoms in nuclear substituents is in the range of 2–15, said copolymerized product being rubbery and being compounded with 25 to 100 weight parts of a mineral pigment selected from the group consisting of silica and aluminum silicate as the sole reinforcing agent per 100 parts of said copolymerized product, said filler having a maximum particle size of about 10 microns.

4. The vulcanized composition of claim 3.

5. The composition of claim 3 wherein the mineral pigment is silica.

6. The composition of claim 3 wherein the copolymerized product is a copolymer of 1,3-butadiene and 2-vinylpyridine.

7. The composition of claim 6 wherein the mineral pigment is silica.

References Cited in the file of this patent

UNITED STATES PATENTS

| | | |
|---|---|---|
| 2,402,020 | Cislak et al. | June 11, 1946 |
| 2,429,439 | Westfahl et al. | Oct. 21, 1947 |